United States Patent
Parron et al.

(10) Patent No.: US 10,142,237 B2
(45) Date of Patent: Nov. 27, 2018

(54) COMMUNICATION CONTROL METHOD AND SYSTEM

(71) Applicant: Intel IP Corporation, Santa Clara, CA (US)

(72) Inventors: Jerome Parron, Fuerth (DE); Alexander Sirotkin, Petach Tikva (IL); Ofer Hareuveni, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 42 days.

(21) Appl. No.: 15/386,871

(22) Filed: Dec. 21, 2016

(65) Prior Publication Data

US 2018/0176135 A1    Jun. 21, 2018

(51) Int. Cl.
| | |
|---|---|
| H04L 12/801 | (2013.01) |
| H04W 28/02 | (2009.01) |
| H04W 52/02 | (2009.01) |
| H04L 12/823 | (2013.01) |
| H04W 88/06 | (2009.01) |
| H04W 88/08 | (2009.01) |
| H04W 84/12 | (2009.01) |

(52) U.S. Cl.
CPC ............ *H04L 47/12* (2013.01); *H04L 47/32* (2013.01); *H04W 28/0278* (2013.01); *H04W 28/0289* (2013.01); *H04W 52/0219* (2013.01); *H04W 84/12* (2013.01); *H04W 88/06* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2005/0159167 A1* | 7/2005 | Hakalin | H04L 45/00 455/453 |
| 2005/0249227 A1 | 11/2005 | Wang et al. | |
| 2009/0196210 A1* | 8/2009 | Desai | H04W 52/0225 370/311 |
| 2009/0279502 A1* | 11/2009 | Zheng | H04W 36/0033 370/331 |

(Continued)

OTHER PUBLICATIONS

Search Report dated Mar. 26, 2018 for PCT Application No. PCT/US17/56963.

*Primary Examiner* — Otis L Thompson, Jr.
(74) *Attorney, Agent, or Firm* — Schiff Hardin LLP

(57) ABSTRACT

A data flow control method and communication device operable to communicate using a first radio access technology (RAT) and a second RAT are described. In a data flow control method, data flow congestion is detected. The congestion can be detected on a first communication link associated with the first RAT. The communication device can be controlled to enter a reduced power operating mode for communications via the first communication link. The entry of the reduced power mode can induce a base station supporting the second communication link associated with the second RAT to perform one or more data flow control operations. A data flow control method can include dropping data packets on a lower protocol layer to induce a higher protocol layer to perform a data flow control operation. The data flow control operation can induce the network to reduce data flow.

17 Claims, 8 Drawing Sheets

(56) References Cited

U.S. PATENT DOCUMENTS

| | | | |
|---|---|---|---|
| 2013/0329639 A1* | 12/2013 | Wietfeldt | H04W 88/06 370/328 |
| 2014/0071815 A1* | 3/2014 | Gu | H04W 28/0289 370/229 |
| 2014/0233391 A1* | 8/2014 | Reider | H04W 52/0212 370/236 |
| 2014/0315490 A1* | 10/2014 | Hughes | H04W 4/008 455/41.2 |
| 2015/0063311 A1 | 3/2015 | Chindapol et al. | |
| 2015/0109927 A1 | 4/2015 | Ozturk et al. | |
| 2015/0117357 A1 | 4/2015 | Ozturk et al. | |
| 2016/0007295 A1* | 1/2016 | Kahn | H04W 52/0251 370/311 |
| 2016/0128004 A1 | 5/2016 | Lee et al. | |
| 2016/0277957 A1 | 9/2016 | Patel et al. | |
| 2016/0366626 A1 | 12/2016 | Krishnamoorthy et al. | |
| 2017/0078890 A1* | 3/2017 | Zhu | H04W 16/14 |
| 2017/0208534 A1* | 7/2017 | Cui | H04W 48/06 |
| 2017/0374579 A1* | 12/2017 | Wang | H04W 28/0278 |
| 2018/0034524 A1* | 2/2018 | Pao | H04B 7/0619 |

\* cited by examiner

COMMUNICATION CONTROL METHOD AND SYSTEM

BACKGROUND

Field

Aspects described herein generally relate to flow control methods and systems for wireless communications, including flow control methods and systems in cellular-WLAN (wireless local area network) aggregation implementations.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1A:
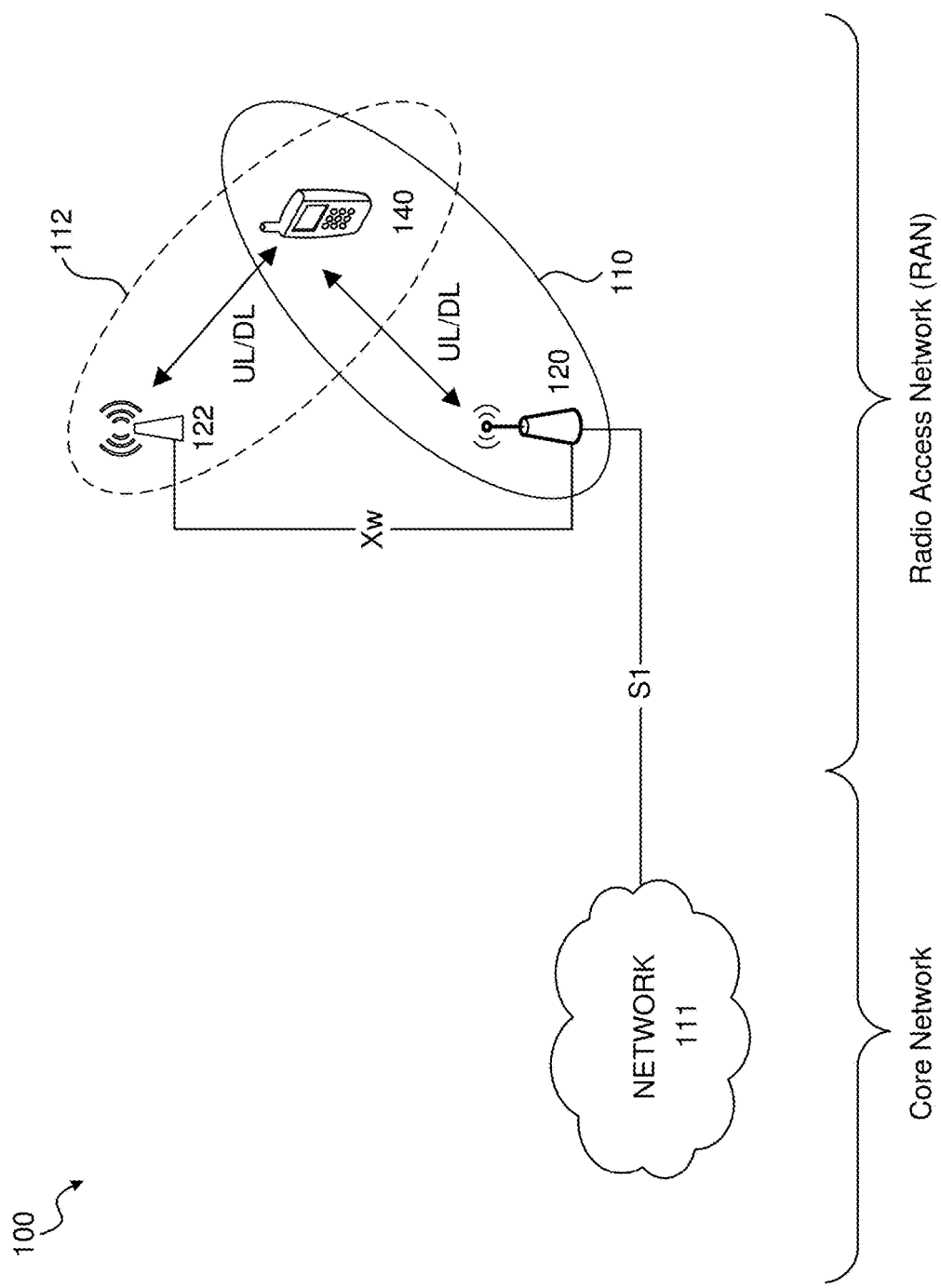
FIG. 1A illustrate an example network environment having a non-collocated base station and access point.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, communication systems can utilize multiple radio access technologies (RATs), including configurations that aggregate two or more RATs for a communication session. For example, a mobile device can communicate with a base station using, for example, the Long Term Evolution (LTE) protocol and an access point (AP) using, for example, one or more wireless local area network (WLAN) protocols (e.g., one or more Institute of Electrical and Electronics Engineers (IEEE) 802.11 protocols). In this example, the base station and the AP can be associated with one another (e.g., associated with the same service provider) and communications via the base station and communication via the AP can be aggregated so that a corresponding communication with the mobile device can be split over the two RAT links.

In aspects configured for LTE-WLAN Aggregation, also known as LWA, data traffic can be split/aggregated over different links: the LTE radio link and the WLAN radio link, where each link has its own protocol. LWA has been standardized by 3rd Generation Partnership Project (3GPP) in LTE Release 13, and further developed in 3GPP's LTE Release 14 as Enhanced LWA (eLWA), which adds support for the 60 Ghz band (IEEE 802.11ad and 802.11ay, also known as Wireless Gigabit Alliance (WiGig)) with 2.16 GHz bandwidth, uplink aggregation, mobility improvements and other enhancements. With LWA, neither the link specific protocols nor the aggregating layer provide an end-to-end flow control mechanism. As a result, the receiving mobile device or mobile station (STA) is unable to notify the sender of a possible congestion of one or both of the links.

For example, in LWA configurations, aggregation can be performed in the Packet Data Convergence Protocol (PDCP) layer. If the mobile device (also known as user equipment (UE)) experiences data flow congestion (e.g., the mobile device is unable to handle the data flow received over WLAN), the mobile device has limited mechanisms to notify the WLAN AP or the base station (also known as eNodeB, or eNB) to reduce traffic over WLAN. For example, the mobile device can notify of the data congestion using the PDCP status report.

However, the PDCP status report is only triggered in response to a request by the base station or is periodically reported. For example, in using the PDCP status report, the mobile device experiencing data congestion is unable to immediately notify the AP and/or base station of the data congestion, and must wait until the next scheduled PDCP status report. In this example, there could be significant delay in the occurrence of the data congestion and the reporting of the congestion via the PDCP status report.

Further, the PDCP status report includes only a report on packets received and processed up until the generation of the PDCP status report, and may not indicate which link is causing the congestion. For example when experiencing data congestion, the mobile device may have data pending in a receiving queue and/or have data that is pending processing for one or more both links.

In exemplary aspects, the mobile device can be configured to perform one or more flow control mechanisms. In these examples, the flow control mechanism can reduce and/or eliminate data flow congestion with increased responsiveness to the occurrence of the data flow congestion.

Figure 1B:
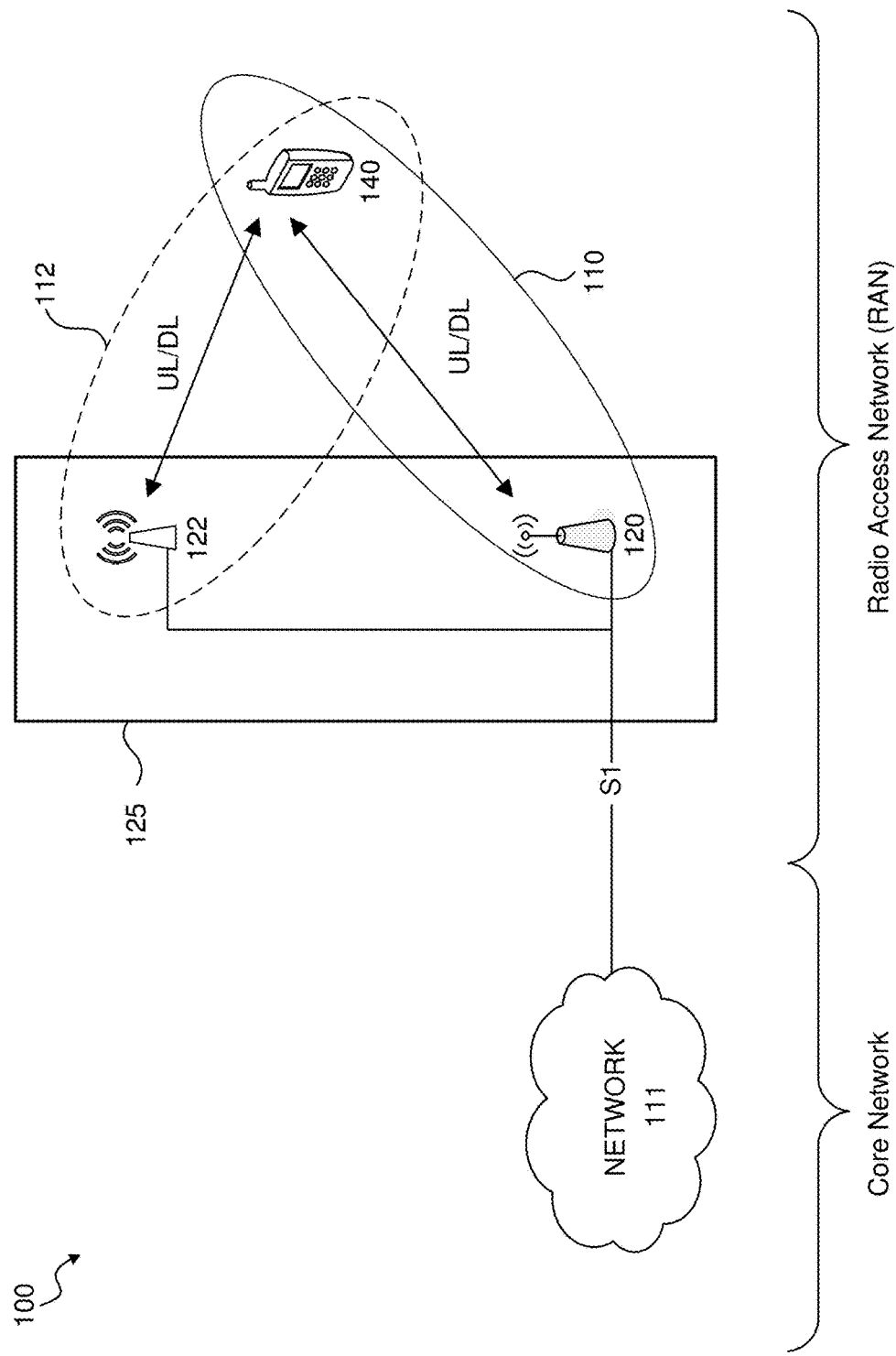
FIG. 1B illustrate an example network environment having a collocated base station and access point.

FIGS. 1A and 1B illustrate example communication environments 100 and 101, respectively, that each include a radio access network (RAN) and a core network. The RAN includes one or more base stations 120 and one or more access points (APs) 122 that are configured to wireless communicate with one or more mobile devices 140.

As illustrated in FIG. 1A, the base station 120 and AP 122 can be non-collocated and the base station(s) 120 and AP(s) 122 can be communicatively coupled to each other via one or more communication interfaces, such as an Xw interface (or one or more other interfaces as would be understood by one of ordinary skill in the art). In this configuration, the WLAN termination (WT) (e.g., WLAN media access control (MAC) layer and/or WLAN physical layer (PHY)) reside outside of the base station 120, and is communicatively coupled to the LWA Adaptation Protocol (LWAAP) of the base station 120.

Alternatively, as illustrated in FIG. 1B, the base station 120 and AP 122 can be collocated in the same radio stack 125. In a collocated configuration, the WLAN termination (WT) of the AP 122 is within the radio stack 125 and the LWAAP of the base station 120 is connected to the WT within the radio stack 125 without the need for a communication interface such as the Xw interface.

The number of base stations 120, APs 122, mobile devices 140, and/or networks 111 are not limited to the exemplary quantities illustrated in FIGS. 1A and 1B, and the communication environments 100 and 101 can include any number of the various components as would be understood by one of ordinary skill in the relevant art(s).

The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base station(s) 120 and AP(s) 122 communicate with one or more service providers and/or one or more other base station(s) 120 and/or AP(s) 122 via the backhaul communication network 111. In an exemplary aspect, the backhaul communication network 111 is an internet protocol (IP) backhaul network. The backhaul communication network 111 can include one or more elements of an evolved packet core, including, for example, one or more Mobility Management Entities (MME), serving gateways (S-GW), public data network (PDN) gateways (P-GW), Home Subscriber Servers (HSS), Access Network Discovery and Selection Functions (ANDSF), Evolved Packet Data Gateways (ePDG), and/or one or more other core network components as would be understood by one of ordinary skill in the relevant arts.

The mobile device 140, the base station 120, and/or AP 122 can each include one or more transceivers configured to transmit and/or receive wireless communications via one or more wireless technologies within the communication environments 100/101. The mobile device 140 can be configured to communicate with the base station 120 in serving cell or sector 110 and/or with the AP 122 in serving cell or sector 112. For example, the mobile device 140 receives signals on one or more downlink (DL) channels from the base station 120 and/or AP 122, and transmits signals to the base station 120 and/or the AP 122 on one or more respective uplink (UL) channels. In an exemplary aspect, the base station 120, AP 122, and/or mobile device 140 each include processor circuitry that is configured to communicate via one or more wireless technologies. The mobile device 140 can be further configured to support co-existing wireless communications with the base station 120 and AP 122.

In an exemplary aspect, the base station 120 and the AP 122 can each support wireless communications conforming to one or more communication protocols. In an exemplary aspect, the base station 120 supports the Long-Term Evolution (LTE) protocol. In this example, the base station 120 can be referred to as LTE base station 120 or eNodeB/eNB 120. Those skilled in the relevant art(s) will understand that the base station 120 is not limited to LTE communications, and can be configured for communications that conform to one or more other protocols in addition to or alternatively to the LTE protocol. In an exemplary aspect, the AP 120 supports one or more IEEE 802.11 protocols. In this example, the AP 122 can be referred to as WLAN AP 122. Those skilled in the relevant art(s) will understand that the AP 122 is not limited to IEEE 802.11 communications, and can be configured for communications that conform to one or more other protocols in addition to or alternatively to the IEEE 802.11 protocols.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 140 may be a stationary device, including, for example, a stationary computing device—such as a personal computer (PC), a desktop computer, a computerized kiosk, and an automotive/aeronautical/maritime in-dash computer terminal.

Figure 2:
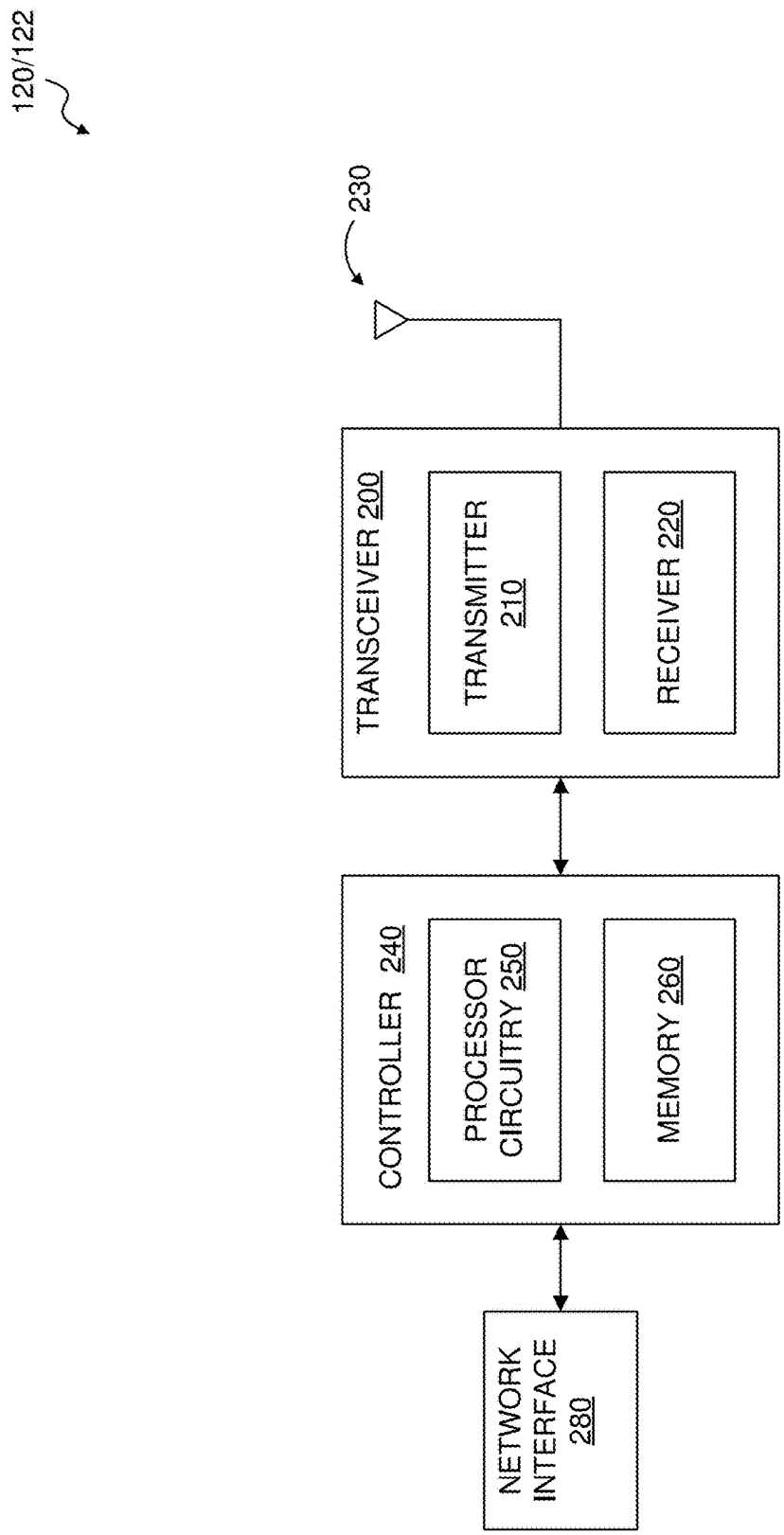
FIG. 2 illustrates a base station according to an exemplary aspect of the present disclosure.

FIG. 2 illustrates an exemplary aspect of the base station 120 and/or AP 122. For example, the base station 120 and/or the AP 122 can include a transceiver 200 and a network interface 280, each communicatively coupled to controller 240.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that the antenna 230 may include an integer array of antennas, and that the antenna 230 may be capable of both transmitting and receiving wireless communication signals.

In aspects directed to the base station 120, transceiver 200 supports one or more cellular communication protocols, such as the Long-Term Evolution (LTE) protocol. In aspects directed to the AP 122, transceiver 200 supports one or more IEEE 802.11 protocols. One of ordinary skill in the relevant arts will understand that the transceiver 200 is not limited to LTE and IEEE 802.11 communications, and can be configured for communications that conform to one or more other cellular and non-cellular protocols in addition to or alternatively to the LTE and IEEE 802.11 protocols.

The network interface 280 includes processor circuitry that is configured to transmit and/or receive communications via one or more wired technologies to/from the backhaul communication network 111. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120 and/or AP 122, and/or of one or more components of the base station 120 and/or AP 122. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.). In an exemplary aspect, the controller 240 can include one or more elements of a protocol stack such as, for example, elements of an evolved universal terrestrial radio access network (EUTRAN) protocol—including, for example, physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
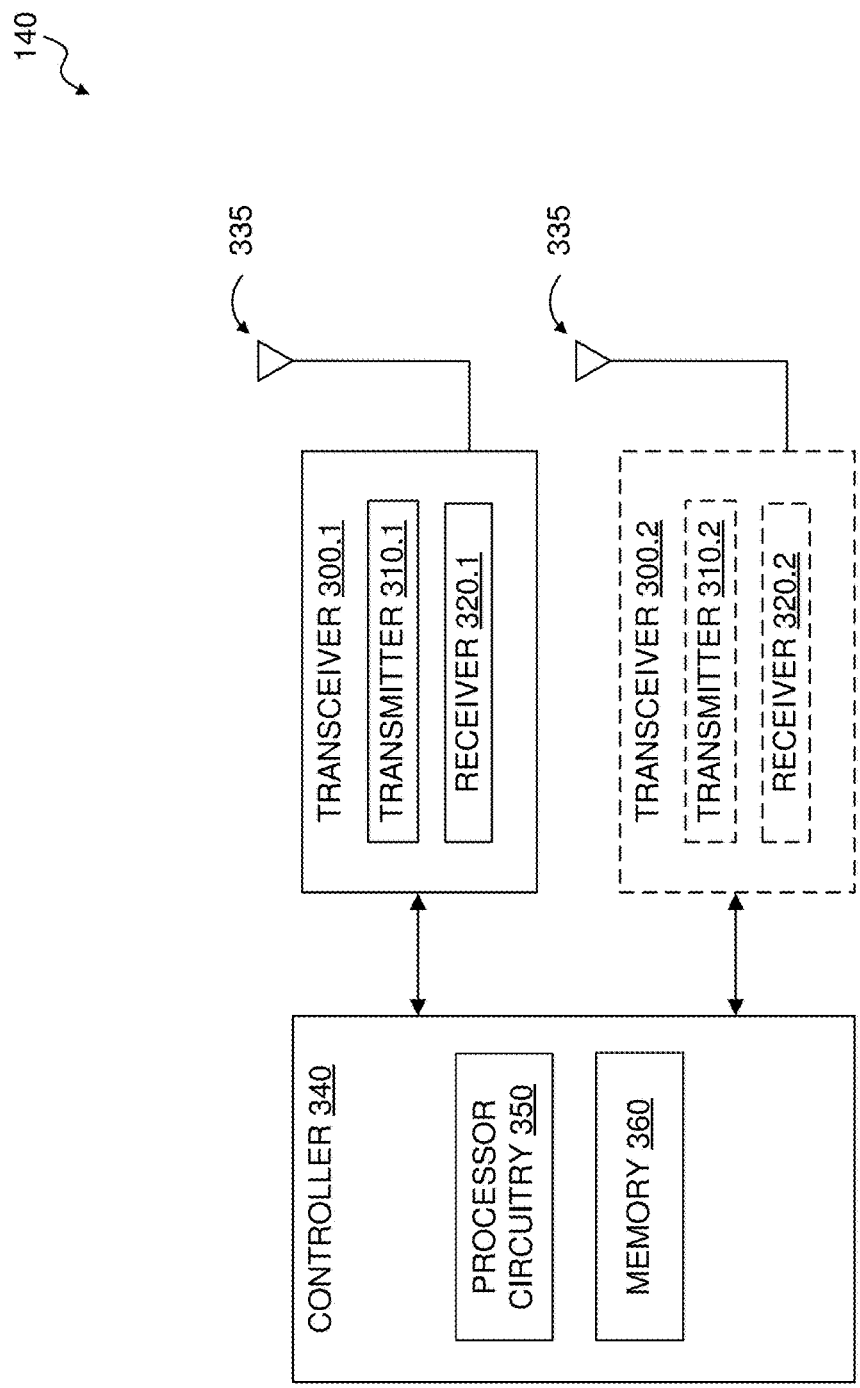
FIG. 3 illustrates a mobile device according to an exemplary aspect of the present disclosure.

FIG. 3 illustrates the mobile device 140 according to an exemplary aspect of the present disclosure. The mobile device 140 can include controller 340 communicatively coupled to one or more transceivers 300 configured to transmit and/or receive wireless communications via one or more wireless technologies within the communication environment 100. In an exemplary aspect, the transceiver 300 is configured to wireless communicate with the base station 120 via a first radio access technology (RAT) (e.g., LTE) and with the AP 122 via a second RAT (e.g. one or more IEEE 802.11 protocols). In other aspects, the mobile device 140 includes a first transceiver 300.1 configured to wireless communicate with the base station 120 via the first RAT and a second transceiver 300.2 configured to wireless communicate with the AP 122 via the second RAT.

The transceiver 300 can include processor circuitry that is configured for transmitting and/or receiving wireless communications conforming to one or more wireless protocols. For example, the transceiver 300 can include a transmitter 310 and a receiver 320 configured for transmitting and receiving wireless communications via one or more antennas 335. In an exemplary aspect, the transceiver 300 includes a WLAN modem configured for WLAN communications and a LTE modem configured for LTE communications. In aspects where the mobile device includes two transceivers 300, the first transceiver 300.1 associated with LTE communications includes a LTE modem, and the second transceiver 300.2 associated with WLAN communications includes a WLAN modem. In other exemplary aspects, the LTE modem and/or WLAN modem are alternatively implemented within the controller 340. In one aspect, the WLAN modem and/or the LTE modem are composed of multiple components with a portion of the components being implemented in the controller 340 and another portion of the components being implemented in the transceiver(s) 300. In an exemplary aspect, the mobile device 140 can include one or more LTE modems and/or WLAN modems that are included in the mobile device 140 and separate from the controller 340 and transceiver(s) 300.

In exemplary aspects, the transceiver 300 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The controller 340 can include processor circuity 350 that is configured to control the overall operation of the mobile device 140, such as the operation of the transceiver(s) 300—including, for example, transmitting and/or receiving of wireless communications via the transceiver 300, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 340 can include one or more elements of a protocol stack such as, a physical (PHY) layer, media access control (MAC), radio link control (RLC), packet data convergence protocol (PDCP), and/or radio resource control (RRC) elements. The Non Access Stratum (NAS) is the protocol between the mobile device (UE) and the Mobility Management Entity (MME) and can be configured for authentication operations, security control and/or the generation of paging messages.

The controller 340 can further include a memory 360 that stores data and/or instructions, where when the instructions are executed by the processor circuitry 350, controls the processor circuitry 350 to perform the functions described herein. The memory 360 can be any well-known volatile and/or non-volatile memory, and can be non-removable, removable, or a combination of both.

In an exemplary aspect, the controller 340 is configured to perform one or more data flow control operations to control the flow of data communications to/from the base station 120 and/or AP 122, and/or to control one or more other components of the mobile device 140 to perform one or more flow control operations. In an exemplary aspect, the flow control operations can include one or more sleep pattern flow control operations and/or one or more packet drop flow control operations. In an exemplary aspect, the processor circuitry 350 is configured to perform one or more operations and/or functions of the controller 340, including performing one or more data flow control operations and/or controlling one or more other components of the mobile device 140 to perform one or more flow control operations.

In an exemplary aspect, to perform one or more sleep pattern flow control operations, the mobile device 140 (e.g., controller 340) is configured to initiate a power saving operating mode (e.g., a reduced power operating mode) or a sleep mode for the mobile device 140 to induce/trigger/ cause the base station 120 and/or AP 122 to implement one or more flow control protocols. For example, the mobile device 140 is configured to initiate a power saving operating mode or a sleep mode for the mobile device 140 for a RAT (e.g., WLAN communications).

For example, the controller 340 can control the mobile device 140 to enter a power savings operating mode for WLAN communications. In an exemplary aspect, the power saving operating mode can include notifying the AP 122 and/or base station 120 that the mobile device's 140 receive capacity, channel capacity and/or other resource capacity (as would be understood by one of ordinary skill in the relevant art) is reduced. For example, mobile device 140 can notify the AP 122 and/or base station 120 that the receive capacity and/or channel capacity is reduced compared to the transmission capacity.

In an exemplary aspect, the mobile device 140 can indicate to the AP 122 that the mobile device 140 has entered a power saving operating mode (e.g., a reduced power operating mode) or a sleep mode without actually entering the power saving operating mode/sleep mode. For example, the mobile device 140 can generate a notification that indicates that a power saving operating mode has been initiated while not initiating a power saving operating mode (e.g., while remaining in a normal operating mode). This notification then serves as a method for the mobile device 140 to trigger a flow control mechanism/operation to be performed by the AP 122, mobile device 120, and/or core network 111. As another example, the mobile device 140 configured for concurrent communication indicate to the AP 122 that the mobile device 140 in in a reduced power mode while remaining in a normal operating mode (e.g., active mode) for another RAT (e.g., LTE).

In an exemplary aspect, the mobile device 140 (e.g., controller 340) can be configured to notify the AP 122 and/or base station 120 of the receive capacity, channel capacity and/or other resource capacity based on, for example (but not limited to) one or more traffic priority categories, one or more access categories, and/or one or more quality of service (QoS) levels. For example, the mobile device 140 can be configured to notify the AP 122 and/or base station 120 if the traffic priority is configured for voice-over internet protocol (VoIP) calls.

In an exemplary aspect, the AP 122 and base station 120 can include a flow control mechanism or protocol to adjust and/or balance communications of the AP 122 and base station 120 (e.g., in an upper segment of the link (e.g., Xw) between the AP 122 and base station 120. In this example, if the mobile device 140 performs one or more sleep pattern flow control operations (e.g., transmit a sleep notification to the AP 122), the transmission queue size will increase at, for example, the AP 122, which can trigger a flow control notification to the base station 120 (via Xw). Based on this notification, the base station 120 can perform one or more flow control procedures (e.g., shift more traffic to the LTE RAT via the base station 120, or reduce traffic on both the LTE RAT and the WLAN RAT). In this example, the end-to-end flow control from the mobile device 140 to the base station 120 is realized via the AP 122 (e.g., via power save/sleep notification provided to the AP 122).

In an exemplary aspect, the mobile device 140 is configured to drop (e.g., locally drop) data in one or more protocol layers on the receiver side to trigger one or more other protocol layers (e.g., one or more higher protocol layers) supporting flow control mechanisms to trigger one or more flow control procedures. For example, the mobile device 140 can locally drop a LWA packet received via the WLAN link if the mobile device 140 detects congestion on the mobile device side. In this example, the Transmission Control Protocol (TCP) layer can trigger one or more flow control mechanisms. These flow control operations can generally be referred to as packet drop flow control operations.

In one or more exemplary aspects, the mobile device 140 can be configured to perform one or more sleep pattern flow control operations, one or more packet drop flow control operations, or a combination of both types of flow control operations.

Sleep Pattern Flow Control

Figure 4:
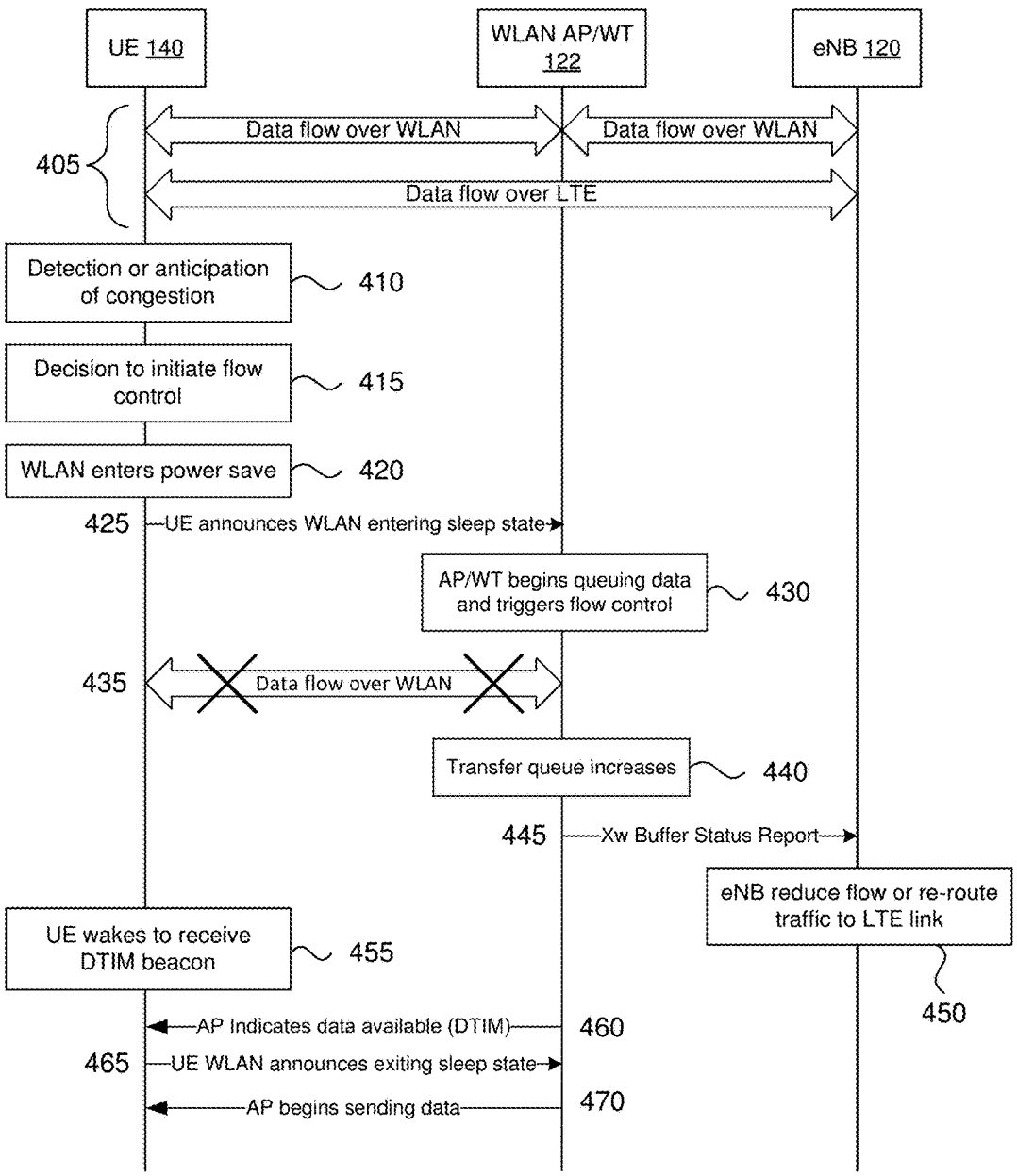
FIGS. 4-7 illustrate flow control methods according to exemplary aspects of the present disclosure.
Figure 5:
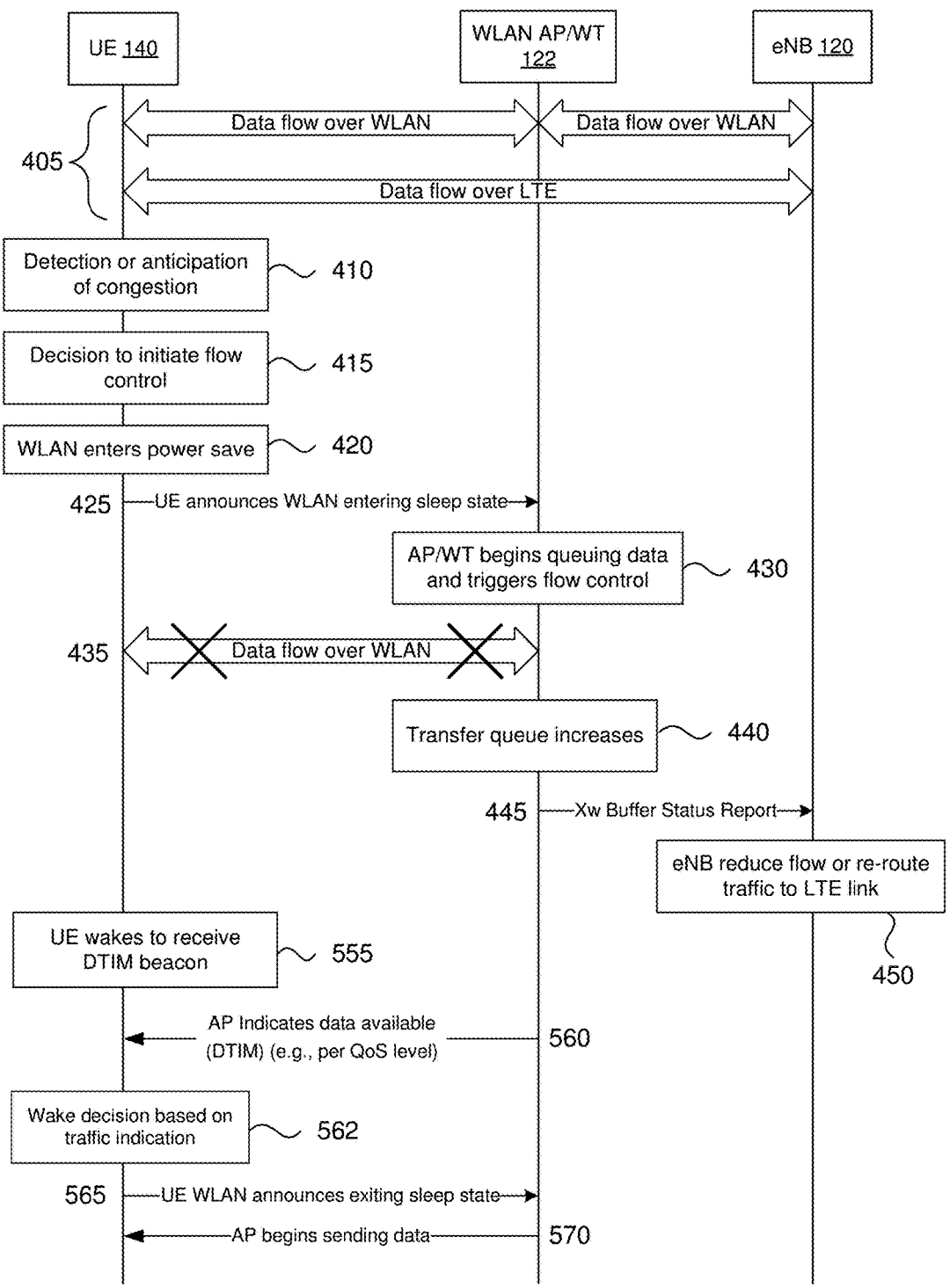
Figure 6:
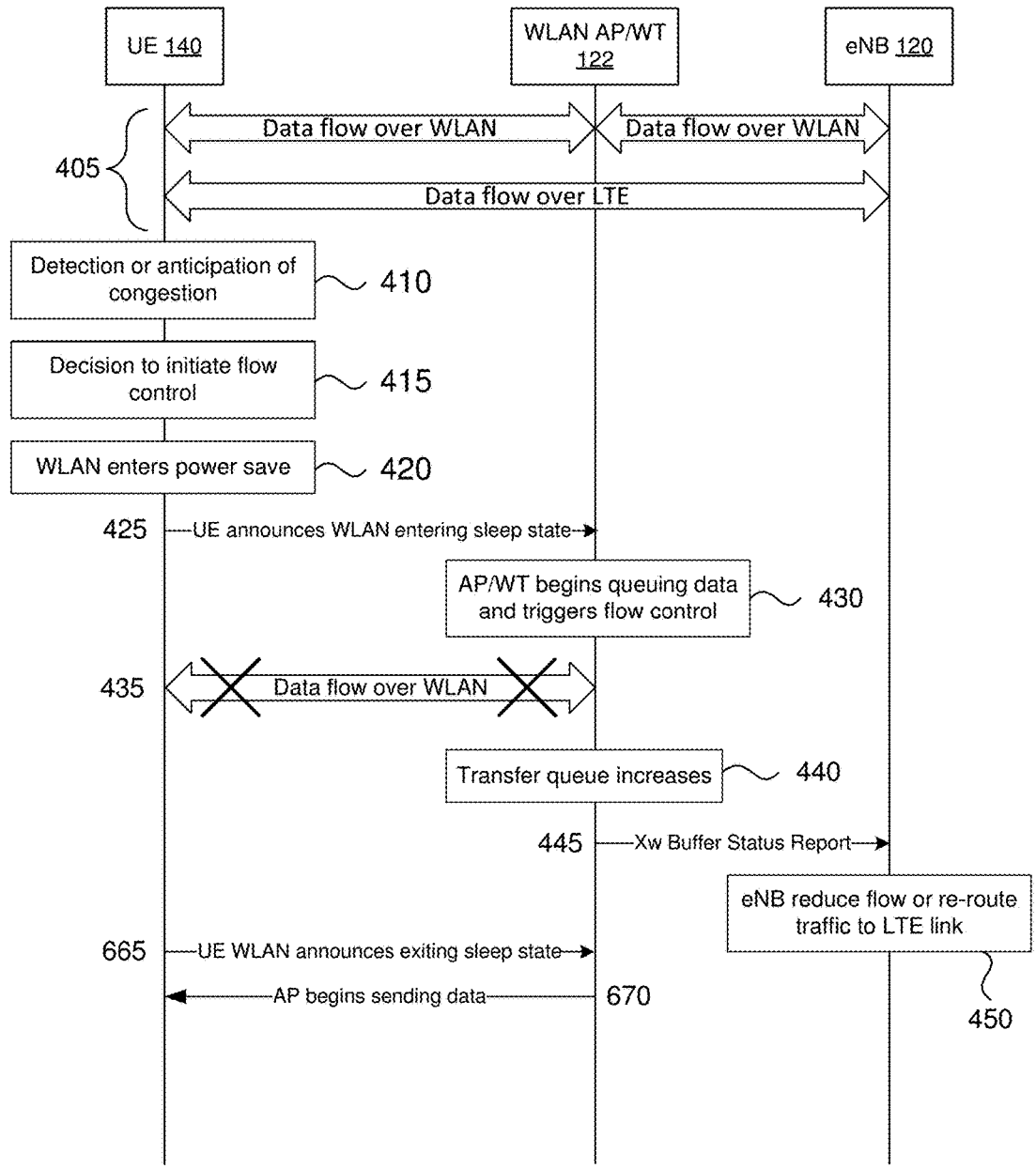

FIGS. 4-6 illustrate sleep pattern flow control methods according to exemplary aspects of the present disclosure. The flowcharts 400, 500, and 600 are described with continued reference to FIGS. 1-3. The operations of the methods are not limited to the order described below, and the various operations may be performed in a different order. Further, two or more operations of the methods may be performed simultaneously with each other.

As illustrated in FIG. 4, the flowchart 400 begins with operation 405, which shows the data flows between the mobile device 140 and the AP 122 and/or base station 120. In operation, the mobile device 140 (e.g., UE 140) is configured to communicate with the base station 120 via data flows (operation 405). The data flows include a WLAN data flow and an LTE data flow. In this example, the mobile device 140 is configured to communication with the base station 120 via the LTE data flow between the mobile device 140 and the base station 120, and/or with the base station 120 using the WLAN data flow via the AP 122.

At operation 410, the mobile device 140 detects, anticipates, and/or otherwise determines that the communication via the WLAN link with the AP 122 and/or via the LTE link with the base station 120 is congested and/or is likely to become congested. In an exemplary aspect, the controller 340 is configured to detect, anticipate, and/or otherwise determine data flow congestion. For example, at operation 410, the mobile device 140 may experience data congestion or overload (e.g., the processor circuitry 350 and/or one or more internal interfaces is overloaded). In an exemplary aspect, the mobile device 140 may anticipate an overload/ congestion in advance based on, for example, historical performance data and/or metrics, one or more environmental conditions, one or more operating conditions of the mobile device 140 (e.g., internal temperature of the mobile device 140), quantity of applications running, available memory of the mobile device 140, available processing resources, and/ or other information as would be understood by one of ordinary skill in the relevant arts.

After operation 410, the flowchart 400 transitions to operation 415, where the mobile device 140 determines or otherwise decides to initiate one or more flow control operations. The determination can be based the detection or anticipation of data flow congestion and/or overload conditions. In an exemplary aspect, the controller 340 (e.g., processor circuitry 350) is configured to determine to initiate one or more flow control operations.

After operation 410, the flowchart 400 transitions to operation 415, where the mobile device 140 enters a power saving mode (also referred to as a sleep mode) for communications confirming to the WLAN protocol(s) based on the determination/decision to initiate one or more flow control operations. For example, a modem (e.g., WLAN modem) of the mobile device 140 associated with the WLAN RAT(s) can enter a power saving mode. In an exemplary aspect, the transceiver 300 includes a WLAN modem that enters the power saving mode.

In an exemplary aspect, at operation 425, the mobile device 140 (e.g., WLAN modem) can indicate (e.g., to the AP 122) that the mobile device 140 (e.g. WLAN modem) has entered a power saving mode for one or more WLAN RATs. In an exemplary aspect, the mobile device 140 (e.g., WLAN modem) generates and transmits one or more power saving mode operation indication communications to the AP 122. In an exemplary aspect, the mobile device 140 does not actually enter the power saving mode (i.e., operation 420 is omitted), but nonetheless generates and transmits the one or more power saving mode operation indication communications to the AP 122 to notify the AP 122 that the mobile device 140 has entered a power saving operating mode. That is, the mobile device 140 falsely indicates to the AP 122 to cause the AP 122 to trigger one or more flow control procedures as discussed below.

After operation 425, the flowchart 400 transitions to operations 430, 435, and 440. At operation 430, the AP 122 initiates one or more flow control procedures to reduce and/or terminate transmissions to the mobile device 140. The reduction or termination of data flow is illustrated in operation 435, where the data flow of the WLAN link is crossed out (as represented by the X's through the data flow). In an exemplary aspect, the AP 122 can initiate the flow control procedure(s) based on, and in response to, the power saving mode operation indication communication(s) received from the mobile device 140.

In an exemplary aspect, throughput of the AP 122 is reduced, and the AP 122 begins queueing data (e.g., buffering packets) as a result of the reduced throughput (begins in operation 430 and the queue may continue to increase in operation 440).

In an exemplary aspect, the AP 122 can indicate to the WLAN termination (WT) about a data congestion occurrence (e.g., the increase in data queueing). The AP 122 can indicate the data congestion to the WT using, for example, one or more Ethernet flow control mechanisms. In an exemplary aspect, the WT is the logical node where the Xw interface between the base station 120 and the AP 122 terminates within the AP 122. In this example, the WT is the interface between the AP 122 and the Xw interface.

In an exemplary aspect, at operation 440, the AP 122 can generate and provide an indication of the data congestion or overload to the base station 120 (e.g., via the Xw interface). In an exemplary aspect, the indication is one or more Xw Buffer Status reports (BSRs). In an exemplary aspect, the WT of the AP 122 generates and provides the indication to the base station 120 via the Xw interface.

At operation 450, the base station 120 can reduce data flow to the mobile device 140 via the AP 122 and the WLAN communications and/or reduce data flow to the mobile device 140 via the LTE communications. In an exemplary aspect, the base station 120 can reroute communications that are to be transmitted to the mobile device 140 via the AP 122 and the WLAN communications to then be transmitted via the LTE communications. This can reduce data congestion associated with the WLAN communications experienced by the mobile device 140. The reduction in data flow and/or rerouting of data between the WLAN and LTE data paths can be based on indication(s) (e.g., Xw BSR) received from the AP 122 (or WT).

At operation, 455, to avoid completely blocking traffic from the AP 122 via the WLAN data path, the mobile device 140 can occasionally (e.g., periodically) exit the power saving mode (e.g., wake from a sleep mode) to receive some data over the WLAN link. After exiting the power saving mode and returning to a normal operating mode, the mobile device 140 can communicate with the AP 122. In an exemplary aspect, the WLAN modem of the mobile device 140 wakes from a sleep mode to receive data over the WLAN link.

In an exemplary aspect, the periodic exit of the power saving mode can be coordinated with a delivery traffic indication map (DTIM) beacon that is transmitted from the AP 122 to the mobile device 140. The DTIM beacon can inform the mobile device 140 about the presence of buffered data on the AP 122. For example, the DTIM beacon can include information regarding pending frames at the AP 122. The DTIM beacon can be generated and transmitted at a frequency specified by the DTIM Interval associated with the AP 122. In an exemplary aspect, the mobile device's 140 wakeup to receive the DTIM beacon is a brief, momentary wake up to allow reception of the DTIM beacon. After receipt, the mobile device 140 can return to the power saving mode (e.g., until the next scheduled beacon is expected). The mobile device 140 can determine when the next DTIM beacon is expected based on the arrival time of the current beacon and/or information contained within the beacon that indicates when the next beacon is to be transmitted by the AP 122.

As illustrated in FIG. 4, at operation 455, the mobile device 140 wakes (e.g., partially or fully exits the power saving mode) to listen for and receive a DTIM beacon transmitted from the AP 122. In an exemplary aspect, the mobile device 140 can periodically wake and listen for the DTIM beacon. For example, the mobile device 140 can wake based on a wake-up timer that is counting the time elapsed from the previous DTIM beacon. Based on this counter value, the mobile device 140 can determine when to wake to listen for and receive the next DTIM beacon. At operation 460, the AP 122 generates and provides the DTIM beacon to the mobile device 140. The DTIM beacon can indicate that there is data buffered on the AP 122 for the mobile device 140. Based on the information provided by the DTIM beacon, the mobile device 140 can determine or otherwise decide to exit power saving mode (e.g. sleep state) to receive data from the AP 122 (e.g., operations 465, 470). The present disclosure is not limited to DTIM beacon configurations, and the AP 122 can generate and transmit other informative frames or packets to the mobile device 140 to identify pending data that is queued at the AP 122 in addition to or alternatively to DTIM beacons.

In an exemplary aspect, the throughput is limited and depends on the wake duration of the mobile device 140. The periodicity of the sleep-wake sequence can be aligned with the periodicity of one or more communication services, including ongoing services. For example, the mobile device 140 can wake from the sleep mode to receive voice packets (e.g., every 20 ms, every 40 ms, etc.).

At operation 465, if the data indication communication from the AP 122 indicates that there is buffered data on the AP 122, the mobile device 140 can exit the power saving mode (e.g., wake from the sleep mode) and announce to the AP 122 that it has exited (or intends to exit) the power saving mode and can receive data via the WLAN link. In an exemplary aspect, the mobile device 140 is configured to send a power save (PS)-poll frame to the AP 122 as the announcement.

Based on the announcement (e.g., PS-poll frame) from the mobile device 140, at operation 470, the AP 122 can resume data communications with the mobile device 140 and transmit the buffered data (and new data from the base station 120) to the mobile device 140.

In an exemplary aspect, the flowchart 400 can be repeated to process future data congestion. For example, operations 410 can be repeated to determine if the mobile device 140 continues or again experiences data congestion. If so, operations 415-470 can then be performed to reduce or alleviate the congestion.

FIG. 5 illustrates a sleep pattern flow control method according to an exemplary aspect of the present disclosure. The flowchart 500 is similar to flowchart 400 and discussion of common operations have been omitted for brevity.

Similar to flowchart 400, the mobile device 140 can occasionally (e.g., periodically) exit the power saving mode (e.g., wake from a sleep mode) to receive some data (e.g., DTIM beacon) over the WLAN link.

As illustrated in FIG. 5, at operation 555, the mobile device 140 exits the power saving mode (e.g., wakes from sleep mode) to listen for and receive a DTIM beacon transmitted from the AP 122. In an exemplary aspect, the mobile device 140 can periodically wake and listen for the DTIM beacon. For example, the mobile device 140 can wake based on a wake-up timer that is counting the time elapsed from the previous DTIM beacon. Based on this counter value, the mobile device 140 can determine when to wake to listen for and receive the next DTIM beacon. At operation 560, the AP 122 generates and transmits the DTIM beacon to the mobile device 140. The DTIM beacon can indicate that there is data buffered on the AP 122 for the mobile device 140. Based on the information provided by the DTIM beacon, the mobile device 140 can determine or otherwise decide to exit power saving mode (e.g. sleep state) to receive data from the AP 122 (e.g., operations 565, 570). In an exemplary aspect, the DTIM beacon (and/or other informative packet or frame) also indicates one or more characteristics or other information about the buffered data. For example, the DTIM beacon can indicate the type of data that is buffered at the AP 122, type of service(s) the data is associated with (e.g., voice call, etc.), quality of service (QoS) associated with the data, and/or other information as would be understood by one of ordinary skill in the relevant arts.

In an exemplary aspect, the periodicity of the sleep-wake sequence can be aligned with the periodicity of one or more communication services, including ongoing services. For example, the mobile device 140 can wake from the sleep mode to receive voice packets (e.g., every 20 ms, every 40 ms, etc.).

At operation 562, the mobile device 140 determines whether to exit the power saving mode (e.g., wake from sleep mode) based on one or more characteristics of the buffered data provided in the indication communication from the AP 122 in operation 560. For example, the mobile device 140 (e.g. controller 340) can be configured to analyze the indication communication to determine one or more characteristics of the buffered data (e.g., the type of data that is buffered, type of service(s) associated with the data that is buffered, the QoS associated with the data, etc.). Based on the analysis, the mobile device 140 can determine whether or not to exit the power saving mode (e.g., wake from sleep mode) to receive the data.

At operation 565, if the mobile device 140 determines to exit the power saving mode (e.g., wake from the sleep mode) based on the one or more characteristics of the buffered data, the mobile device 140 can exit the power saving mode (e.g., wake from the sleep mode) and announce to the AP 122 that it has exited (or intends to exit) the power saving mode and can receive data via the WLAN link. In an exemplary aspect, the mobile device 140 is configured to send a power save (PS)-poll frame to the AP 122 as the announcement.

Based on the announcement (e.g., PS-poll frame) from the mobile device 140, at operation 570, the AP 122 can resume data communications with the mobile device 140 and transmit the buffered data (and new data from the base station 120) to the mobile device 140.

In an exemplary aspect, the flowchart 500 can be repeated to process future data congestion. For example, operations 510 can be repeated to determine if the mobile device 140 continues or again experiences data congestion. If so, operations 515-570 can then be performed to reduce or alleviate the congestion.

FIG. 6 illustrates a sleep pattern flow control method according to an exemplary aspect of the present disclosure. The flowchart 600 is similar to flowcharts 400 and 500, and discussion of common operations have been omitted for brevity.

Similar to flowcharts 400 and 500, the mobile device 140 can occasionally exit the power saving mode (e.g., wake from a sleep mode) to receive some data over the WLAN link.

As illustrated in FIG. 6, at operation 665, the mobile device 140 determines or otherwise decides to exit the power saving mode (e.g., wakes from sleep mode). The mobile device 140 can exit the power saving mode (e.g., wake from the sleep mode) and announce to the AP 122 that it has exited (or intends to exit) the power saving mode and can receive data via the WLAN link. In this example, the determination to exit the power saving mode can be independent of WLAN beacon monitoring. In an exemplary aspect, the mobile device 140 can determine a data congestion level or severity, and can decide to exit the power saving mode (e.g., wakes from sleep mode) based on this determination.

Based on the announcement from the mobile device 140, at operation 670, the AP 122 can resume data communications with the mobile device 140 and transmit the buffered data (and new data from the base station 120) to the mobile device 140.

In an exemplary aspect, the flowchart 600 can be repeated to process future data congestion. For example, operations 610 can be repeated to determine if the mobile device 140 continues or again experiences data congestion. If so, operations 615-670 can then be performed to reduce or alleviate the congestion.

Packet Drop Flow Control

Figure 7:
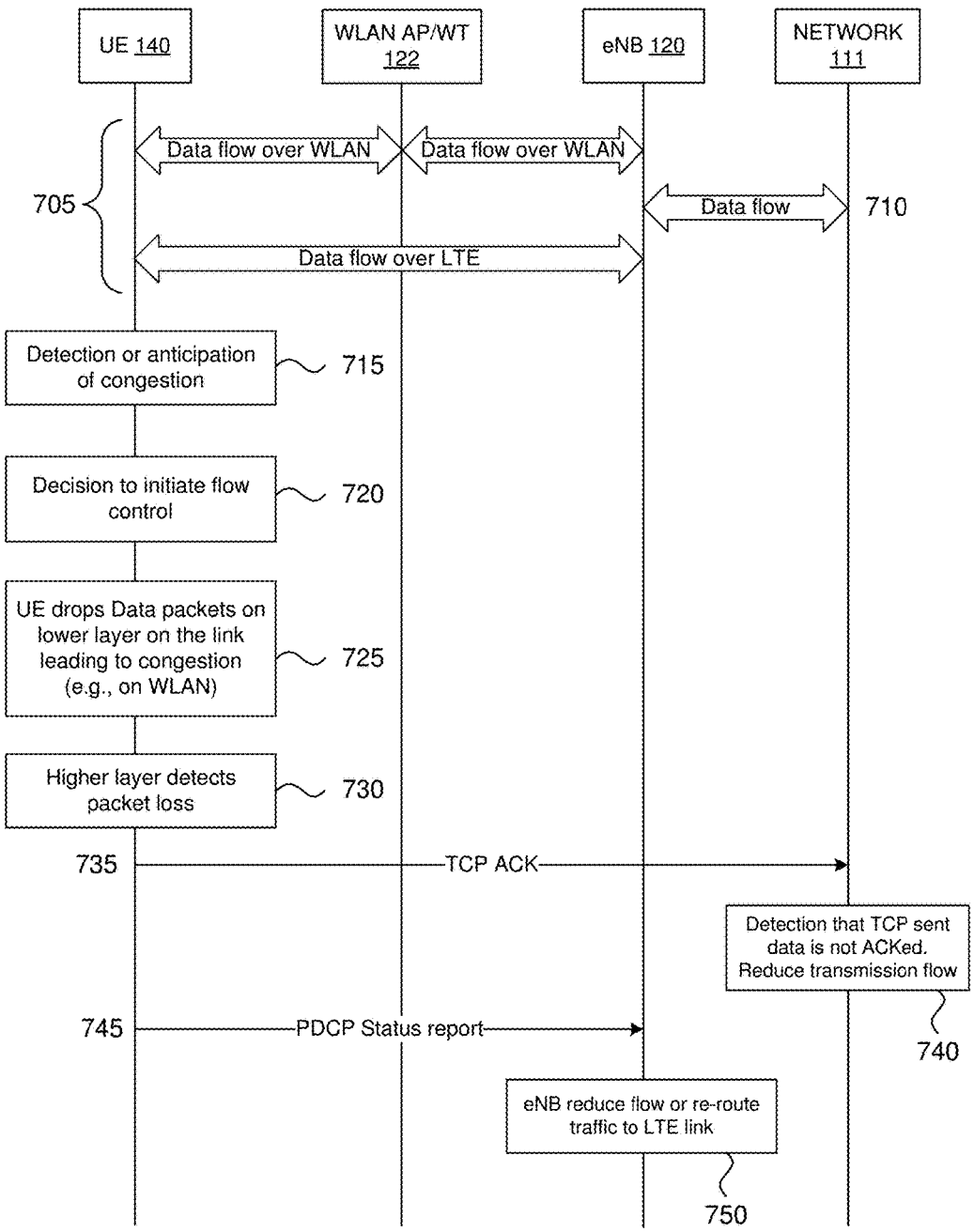

FIG. 7 illustrates packet drop flow control method 700 according to an exemplary aspect of the present disclosure. The flowchart 700 is described with continued reference to FIGS. 1-6. The operations of the method are not limited to the order described below, and the various operations may be performed in a different order. Further, two or more operations of the methods may be performed simultaneously with each other.

As illustrated in FIG. 7, the flowchart 700 begins with operations 705 and 710.

Operation 705 illustrates the data flows between the mobile device 140 and the AP 122 and base station 120. The data flows include a WLAN data flow and an LTE data flow, respectively. Operation 710 illustrates the data flow between the base station 120 and the core network 111.

In this example, the mobile device 140 is configured to communication with the base station 120 via the LTE link between the mobile device 140 and the base station 120, and/or with the base station 120 using the WLAN link via the AP 122.

At operation 715, the mobile device 140 detects, anticipates, and/or otherwise determines that the communication via the WLAN link with the AP 122 and/or via the LTE link with the base station 120 is congested and/or is likely to become congested. In an exemplary aspect, the controller 140 is configured to detect, anticipate, and/or otherwise determine data flow congestion. For example, at operation 715, the mobile device 140 may experience data congestion or overload (e.g., the processor circuitry 350 and/or one or more internal interfaces is overloaded). In an exemplary aspect, the mobile device 140 may anticipate an overload/congestion in advance based on, for example, historical performance data and/or metrics, one or more environmental conditions, one or more operating conditions of the mobile device 140 (e.g., internal temperature of the mobile device 140), quantity of applications running, available memory of the mobile device 140, and/or other information as would be understood by one of ordinary skill in the relevant arts.

After operation 715, the flowchart 700 transitions to operation 720, where the mobile device 140 determines or otherwise decides to initiate one or more flow control operations. The determination can be based the detection or anticipation of data flow congestion and/or overload conditions. In an exemplary aspect, the controller 340 (e.g., processor circuitry 350) is configured to determine to initiate one or more flow control operations.

After operation 720, the flowchart 700 transitions to operation 725, where the mobile device 140 drops (e.g., locally drops) data packet(s) in one or more protocol layers (e.g., a lower layer) on the receiver side to trigger one or more other protocol layers (e.g., one or more higher protocol layers) supporting flow control mechanisms to trigger one or more flow control procedures. In an exemplary aspect, the lower layer in which the packet is dropped does not support flow control mechanisms. In an exemplary aspect, the mobile device 140 drops the data packets in response to the decision (operation 720) to initiate one or more flow control operations in operation 720. The dropping of the data packet(s) for one or more of the radio links can lead to congestion in one or more of the radio links. For example, the dropping of the data packet(s) of the WLAN link can cause congestion in the WLAN link (and/or in the LTE link). The created congestions from the dropped packet(s) can induce the core network 111 to take correction action to address the congestion.

In an exemplary aspect, the mobile device 140 can locally drop a LWA packet received via the WLAN link if the mobile device 140 detects congestion on the mobile device side. In an exemplary aspect, as described in detail below, the Transmission Control Protocol (TCP) layer can trigger one or more flow control mechanisms.

In an exemplary aspect, the mobile device 140 can locally drop the earliest (i.e., oldest) packet or packets in a lower protocol layer. In this example, the dropping of the older packets first will result in the upper layer being notified faster (e.g., the upper layer will experience the dropped packet event sooner than if a more recent packet in the queue gets dropped as it will take longer to pass to the upper layer). That is, the upper layer will be notified as early as possible of the loss of data, which result in the upper layer triggering one or more flow control procedures sooner. The packet or packets that are dropped is not limited to the earliest (oldest) packet(s) and can be another packet or packets within the buffer. In an exemplary aspect, a single packet is dropped, but the disclosure is not limited thereto and another number of packets can be dropped. For example, a single packet can be dropped to trigger flow control in the upper protocol layer (e.g. TCP layer). If, for example, congestion is significant (e.g., exceeds a congestion threshold), the mobile device 140 can drop additional packets to reduce the processing load in the higher layer(s) due to less packets being processed as described below.

In an exemplary aspect, the packet drop event in the lower layer reduces the processing in the higher layer(s). In this example, the source of the congestion may be due to the processing in the higher layer(s). Therefore, by dropping one or more packets in the lower layer (e.g., after a first packet triggers flow control, additional packets can be dropped to reduce processing loads), the higher layer processing of those dropped packets is omitted, thereby reducing a possible source of the congestion.

At operation 730, the higher protocol layer detects the packet loss. For example, the TCP layer of the mobile device 140 can detect the packet loss.

In response to the detected packet loss, the mobile device 140 can report the packet loss or the non-reception of packets to the core network 111 and/or the base station 120. In an exemplary aspect, the higher protocol layer (e.g., TCP layer) in the mobile device 140 reports the loss or the non-reception of a packet.

In an exemplary aspect, the mobile device 140 can report the packet loss or the non-reception of packets to the core network 111 (via the base station 120) using one or more acknowledgements (ACKs) and/or Non-acknowledgments (NACKs). For example, the mobile device 140 can generate an ACK that acknowledges the received packets. Because the core network 111 is aware of the packets that the mobile device 140 should have received, the packets that have not been acknowledged by the ACK from the mobile device 140 can be determined (e.g., packets A, B, C were transmitted to the mobile device 140. If packets A and B are acknowledged, the core network 111 can determine that packet C was not acknowledged given that the core network 111 has the knowledge that packets A-C were originally sent). These non-acknowledged packets will include the packets intentionally dropped by the lower protocol layer of the mobile device 140. Alternatively, a NACK can be used to directly indicate which packets have not been received by the mobile device 140.

At operation 740, the transmission flow can be reduced or halted. The reduction or stoppage of the transmission flow can be in response to the acknowledgement of packets from the mobile device 140 in operation 735. In an exemplary aspect, the core network 111 is configured to reduce or stop the data flow. In this example, the reduction or stoppage of the data flow by the core network 111 will reduce the congestion experienced by the mobile device 140.

As shown in operation 745, in an exemplary aspect, the mobile device 140 notifies the base station 120 of lost data using, for example, a Packet Data Convergence Protocol (PDCP) status report. In operation, the PDCP report can be triggered periodically and/or upon request by the base station 120. In response to the PDCP report, the base station 120 can reduce data traffic to the mobile device 140 via the AP 122 and the WLAN link and/or reduce data traffic to the mobile device 140 via the LTE link. In an exemplary aspect, the base station 120 can reroute communications intended to be transmitted to the mobile device 140 via the AP 122 and the WLAN link so as to be transmitted via the LTE link to reduce data congestion associated with the WLAN link experienced by the mobile device 140.

Because the PDCP status report is periodically reported, the notification of the loss of data may be delayed depending on when the next PDCP status report is scheduled. Therefore, the forced packet drop in operation 725 provides an end-to-end flow control operation to the mobile device 140 that allows for a more responsive and faster notification of the data congestion event. This provides more responsive and faster performance of corrective measures to more quickly reduce the congestion.

EXAMPLES

Example 1 is data flow control method for a communication device configured to communicate using a first radio access technology (RAT) and a second RAT, comprising: detecting data flow congestion on a first communication link via the first RAT; and controlling the communication device to trigger a base station supporting a second communication link associated with the second RAT to perform one or more data flow operations based on the communication device's intention to enter a reduced power operating mode for communications via the first communication link.

In Example 2, the subject matter of Example 1, further comprising: notifying the base station of the communication device's intention to enter the reduced power operating mode to trigger the base station to perform the one or more data flow operations.

In Example 3, the subject matter of Example 1, further comprising: controlling the communication device to enter the reduced power operating mode for communications via the first communication link.

In Example 4, the subject matter of Example 2, wherein the notification that the communication device intends to enter the reduced power operating mode triggers increased data buffering in an access point (AP) supporting the first communication link and associated with the base station, the increased data buffering triggering the base station to perform the one or more data flow control operations.

In Example 5, the subject matter of Example 4, wherein the triggering of the base station to perform one or more data flow control operations by the base station is based on a buffer status report (BSR) received by the base station from the AP, the BSR being generating by the AP in response to the increased data buffering at the AP.

In Example 6, the subject matter of Example 3, further comprising periodically exiting the reduced power mode to check for available data communications associated with the first RAT.

In Example 7, the subject matter of Example 6, further comprising: analyzing the available data communications; and receiving the available communications based on the analysis.

In Example 8, the subject matter of Example 1, wherein the communication device is configured to aggregate a first RAT communication received via the first communication link and a second RAT communication received via the second communication link.

In Example 9, the subject matter of Example 1, wherein the first RAT conforms to one or more Institute of Electrical and Electronics Engineers (IEEE) 802.11 protocols and the second RAT conforms to one or more Long Term Evolution (LTE) protocols.

In Example 10, the subject matter of Example 6, wherein the communication device is configured to perform LTE-WLAN Aggregation (LWA) of the first RAT and the second RAT.

Example 11 is a communication device adapted for communications based on a first radio access technology (RAT) and a second RAT, comprising: a transceiver configured to transmit or receive communications based on the first RAT and the second RAT; and a controller configured to: detect data flow congestion on a first communication link via the first RAT; and control the communication device to trigger a base station supporting a second communication link associated with the second RAT to perform one or more data flow control operations based on the communication device's intention to enter a reduced power operating mode for communications via the first communication link.

In Example 12, the subject matter of Example 11, wherein the controller is further configured to: notify the base station of the communication device's intention to enter the reduced power operating mode to trigger the base station to perform the one or more data flow operations.

In Example 13, the subject matter of Example 11, wherein the controller is further configured to: control the communication device to enter the reduced power operating mode for communications via the first communication link.

In Example 14, the subject matter of Example 11, wherein the notification that the communication device intends to enter the reduced power operating mode triggers increased data buffering in an access point (AP) supporting the first communication link, the increased data buffering inducing the performance of the one or more data flow control operations by the base station.

In Example 15, the subject matter of Example 14, wherein triggering of the base station to perform one or more data flow control operations by the base station is based on a buffer status report (BSR) received by the base station from the AP, the BSR being generating by the AP in response to the increased data buffering at the AP.

In Example 16, the subject matter of Example 13, wherein the controller is further configured to control the communication device to periodically exit the reduced power mode to check for available data communications associated with the first RAT.

In Example 17, the subject matter of Example 16, wherein the controller is further configured to: analyze the available data communications; and control the communication device to receive the available communications based on the analysis.

In Example 18, the subject matter of Example 11, wherein the communication device is configured to aggregate a first RAT communication received via the first communication link and a second RAT communication received via the second communication link.

In Example 19, the subject matter of Example 11, wherein the first RAT conforms to one or more Institute of Electrical and Electronics Engineers (IEEE) 802.11 protocols and the second RAT conforms to one or more Long Term Evolution (LTE) protocols.

Example 20 is a data flow control method for a communication device configured to communicate using a first radio access technology (RAT) and a second RAT, comprising: detecting data flow congestion on a first communication link associated with the first RAT; and dropping one or more data packets on a first protocol layer; and performing one or more data flow control operations in a second protocol layer based on the one or more data packets dropped in the first protocol layer.

In Example 21, the subject matter of Example 20, wherein the second protocol layer is a higher protocol layer than the first protocol layer.

In Example 22, the subject matter of Example 20, wherein preforming the one or more data flow control operations triggers a communication network supporting the first RAT and the second RAT to reduce transmissions to the communication device via the first communication link and/or the second communication link.

In Example 23, the subject matter of Example 20, further comprising generating a status report to request reduced transmissions to the communication device via the first communication link.

In Example 24, the subject matter of Example 20, wherein the communication device is configured to aggregate a first RAT communication received via the first communication link and a second RAT communication received via the second communication link.

In Example 25, the subject matter of Example 20, wherein the first RAT conforms to one or more Institute of Electrical and Electronics Engineers (IEEE) 802.11 protocols and the second RAT conforms to one or more Long Term Evolution (LTE) protocols.

In Example 26, the subject matter of any of Examples 1-2, further comprising: controlling the communication device to enter the reduced power operating mode for communications via the first communication link.

In Example 27, the subject matter of any of Examples 1-7, wherein the communication device is configured to aggregate a first RAT communication received via the first communication link and a second RAT communication received via the second communication link.

In Example 28, the subject matter of any of Examples 1-8, wherein the first RAT conforms to one or more Institute of Electrical and Electronics Engineers (IEEE) 802.11 protocols and the second RAT conforms to one or more Long Term Evolution (LTE) protocols.

In Example 29, the subject matter of Example 28, wherein the communication device is configured to perform LTE-WLAN Aggregation (LWA) of the first RAT and the second RAT.

Example 30 is a computer program product embodied on a computer-readable medium comprising program instructions, when executed, causes a processor to perform the method of any of Examples 1-10 and 20-25.

Example 31 is an apparatus comprising means to perform the method as described in any of Examples 1-10 and 20-25.

Example 32 is a wireless mobile communication device comprising processor circuitry configured to perform the method as described in any of Examples 1-10 and 20-25.

Example 33 is a wireless mobile communication device configured to perform the method as described in any of Examples 1-10 and 20-25.

Example 34 is an apparatus substantially as shown and described.

Example 35 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE) and/or IEEE 802.11 protocols, and can be applied to other cellular communication standards, including (but not limited to) LTE Advanced, one or more fifth generation (5G) communications, Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX) (Institute of Electrical and Electronics Engineers (IEEE) 802.16), and/or one or more cellular communications using one or frequency bands of the industrial, scientific and medical (ISM) radio bands to provide some examples. Further, exemplary aspects are not limited to cellular communication networks and can be used or implemented in other kinds of wireless communication access networks, including (but not limited to) Bluetooth, Near-field Communication (NFC) (ISO/IEC 18092), ZigBee (IEEE 802.15.4), Z-Wave, Radio-frequency identification (RFID), and/or one or more non-cellular communications using one or frequency bands of the ISM radio bands to provide some examples. Further, exemplary aspects are not limited to the above wireless networks and can be used or implemented in one or more wired networks using one or more well-known wired specifications and/or protocols.

What is claimed is:

1. A data flow control method for a communication device configured to communicate using a first radio access technology (RAT) and a second RAT, comprising:
    detecting data flow congestion on a first communication link via the first RAT;
    controlling the communication device to trigger a base station supporting a second communication link associated with the second RAT to perform one or more data flow operations based on the communication device's intention to enter a reduced power operating mode for communications via the first communication link; and
    notifying the base station of the communication device's intention to enter the reduced power operating mode to trigger the base station to perform the one or more data flow operations, the notification triggering increased data buffering in an access point (AP) supporting the first communication link and associated with the base station, the increased data buffering triggering the base station to perform the one or more data flow control operations.

2. The data flow control method of claim 1, further comprising:
    controlling the communication device to enter the reduced power operating mode for communications via the first communication link.

3. The data flow control method of claim 2, further comprising periodically exiting the reduced power mode to check for available data communications associated with the first RAT.

4. The data flow control method of claim 3, further comprising:
    analyzing the available data communications; and
    receiving the available communications based on the analysis.

5. The data flow control method of claim 3, wherein the communication device is configured to perform LTE-WLAN Aggregation (LWA) of the first RAT and the second RAT.

6. The data flow control method of claim 1, wherein the triggering of the base station to perform one or more data flow control operations by the base station is based on a buffer status report (BSR) received by the base station from the AP, the BSR being generating by the AP in response to the increased data buffering at the AP.

7. The data flow control method of claim 1, wherein the communication device is configured to aggregate a first RAT communication received via the first communication link and a second RAT communication received via the second communication link.

8. The data flow control method of claim 1, wherein the first RAT conforms to one or more Institute of Electrical and Electronics Engineers (IEEE) 802.11 protocols and the second RAT conforms to one or more Long Term Evolution (LTE) protocols.

9. The data flow control method of claim 1, wherein the communication device is configured to perform LTE-WLAN Aggregation (LWA) of the first RAT and the second RAT.

10. A communication device adapted for communications based on a first radio access technology (RAT) and a second RAT, comprising:
    a transceiver configured to transmit or receive communications based on the first RAT and the second RAT; and
    a controller configured to:
        detect data flow congestion on a first communication link via the first RAT;
        control the communication device to trigger a base station supporting a second communication link associated with the second RAT to perform one or more data flow control operations based on the communication device's intention to enter a reduced power operating mode for communications via the first communication link; and
        notify the base station of the communication device's intention to enter the reduced power operating mode to trigger the base station to perform the one or more data flow operations, wherein the notification that the communication device intends to enter the reduced power operating mode triggers increased data buffering in an access point (AP) supporting the first communication link, the increased data buffering inducing the performance of the one or more data flow control operations by the base station.

11. The communication device of claim 10, wherein the controller is further configured to:
    control the communication device to enter the reduced power operating mode for communications via the first communication link.

12. The communication device of claim 11, wherein the controller is further configured to control the communication device to periodically exit the reduced power mode to check for available data communications associated with the first RAT.

13. The communication device of claim 12, wherein the controller is further configured to:
    analyze the available data communications; and
    control the communication device to receive the available communications based on the analysis.

14. The communication device of claim 10, wherein triggering of the base station to perform one or more data flow control operations by the base station is based on a buffer status report (BSR) received by the base station from the AP, the BSR being generating by the AP in response to the increased data buffering at the AP.

15. The communication device of claim 10, wherein the communication device is configured to aggregate a first RAT communication received via the first communication link and a second RAT communication received via the second communication link.

16. The communication device of claim 10, wherein the first RAT conforms to one or more Institute of Electrical and Electronics Engineers (IEEE) 802.11 protocols and the second RAT conforms to one or more Long Term Evolution (LTE) protocols.

17. The communication device of claim 10, wherein the controller is further configured to control the communication device to perform LTE-WLAN Aggregation (LWA) of the first RAT and the second RAT.

* * * * *